(12) United States Patent  
Qin et al.

(10) Patent No.: US 10,121,047 B2  
(45) Date of Patent: Nov. 6, 2018

(54) FINGERPRINT IDENTIFICATION DEVICE, TOUCH PANEL, INPUT DEVICE AND FINGERPRINT IDENTIFICATION METHOD

(71) Applicant: BOE TECHNOLOGY GROUP CO., LTD., Beijing (CN)

(72) Inventors: Wei Qin, Beijing (CN); Jiayang Zhao, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 79 days.

(21) Appl. No.: 15/303,225

(22) PCT Filed: Dec. 7, 2015

(86) PCT No.: PCT/CN2015/096512  
§ 371 (c)(1),  
(2) Date: Oct. 11, 2016

(87) PCT Pub. No.: WO2016/206311  
PCT Pub. Date: Dec. 29, 2016

(65) Prior Publication Data  
US 2017/0140194 A1    May 18, 2017

(30) Foreign Application Priority Data  
Jun. 26, 2015 (CN) .......................... 2015 1 0362766

(51) Int. Cl.  
*G06K 9/28* (2006.01)  
*G06K 9/00* (2006.01)  
*G06F 3/044* (2006.01)

(52) U.S. Cl.  
CPC ........... *G06K 9/0002* (2013.01); *G06F 3/044* (2013.01); *G06K 9/00087* (2013.01)

(58) Field of Classification Search  
CPC .................................................. G06K 9/0002  
See application file for complete search history.

(56) References Cited

U.S. PATENT DOCUMENTS 5,847,690 A    12/1998  Boie et al.  
6,055,324 A *   4/2000  Fujieda ................ G06K 9/0002  
                                                    382/124

(Continued)

FOREIGN PATENT DOCUMENTS

CN       1577375 A    2/2005  
CN     102183853 A    9/2011

(Continued)

OTHER PUBLICATIONS

International Search Report and Written Opinion for Application No. PCT/CN2015/096512, dated Dec. 7, 2015, 12 Pages.

(Continued)

*Primary Examiner* — Brian Werner  
(74) *Attorney, Agent, or Firm* — Brooks Kushman P.C.

(57) ABSTRACT

The present disclosure provides a fingerprint identification device, a touch panel, an input device and a fingerprint identification method. The fingerprint identification device includes a fingerprint identification module, gate lines and signal lines. The gate lines and the signal lines cross so as to define a plurality of sensing regions including a thin film transistors and a sensing electrode connected to the thin film transistors. A gate electrode of the thin film transistor is connected to the corresponding gate line, a source electrode is connected to the corresponding signal line, and a drain electrode is connected to the corresponding sensing electrode. The signal lines include signal-transmitting lines and signal-receiving lines, the sensing electrodes include transmitting electrodes and receiving electrodes. An electric field is generated between the transmitting electrode and the receiving electrode adjacent to the transmitting electrode, and a direction of the electric field is from the transmitting electrode to the receiving electrode adjacent to the transmitting electrode. The fingerprint identification module is connected to the signal-receiving lines, and determines, by (Continued)

detecting the intensity of the electric field when a finger is in the electric field, a fingerprint of the finger.

20 Claims, 10 Drawing Sheets

(56) References Cited

U.S. PATENT DOCUMENTS

| | | |
|---|---|---|
| 2004/0150629 A1 | 8/2004 | Lee |
| 2010/0079402 A1* | 4/2010 | Grunthaner ........... G06F 3/0418 345/174 |
| 2014/0022188 A1 | 1/2014 | Ahn |
| 2016/0027356 A1 | 1/2016 | Cheng et al. |
| 2016/0041664 A1 | 2/2016 | Qin et al. |
| 2017/0364178 A1* | 12/2017 | Nelson ................. G06K 9/0002 |

FOREIGN PATENT DOCUMENTS

| | | |
|---|---|---|
| CN | 102301320 A | 12/2011 |
| CN | 102749774 A | 10/2012 |
| CN | 103500747 A | 1/2014 |
| CN | 103543870 A | 1/2014 |
| CN | 203519963 U | 4/2014 |
| CN | 104166489 A | 11/2014 |
| CN | 104252277 A | 12/2014 |
| CN | 104318210 A | 1/2015 |
| CN | 104408441 A | 3/2015 |
| CN | 105095855 A | 11/2015 |
| JP | 2005257356 A | 9/2005 |
| JP | 2012150062 A | 8/2012 |

OTHER PUBLICATIONS

First Office Action for Chinese Application No. 201510362766.9, dated Dec. 14, 2017, 8 Pages.

* cited by examiner

FINGERPRINT IDENTIFICATION DEVICE, TOUCH PANEL, INPUT DEVICE AND FINGERPRINT IDENTIFICATION METHOD

CROSS-REFERENCE TO RELATED APPLICATIONS

This application is the U.S. national phase of PCT Application No. PCT/CN2015/096512 filed on Dec. 7, 2015, which claims priority to Chinese Patent Application No. 201510362766.9 filed on Jun. 26, 2015, the disclosures of which are incorporated in their entirety by reference herein.

TECHNICAL FIELD

The present disclosure relates to electronic technology and display technology, particularly to a fingerprint identification device, a touch panel, an input device and a fingerprint identification method.

BACKGROUND

With the development of the market, fingerprint identification technology has become one of important functions of electronic products, and many electronics manufacturers have been concerned about and have applied this function in its electronic products. It is generally believed that fingerprint identification devices will provide key technical support for the future society to implement mobile payment, because the fingerprint identification technology can significantly improve safety and convenience of mobile payment.

Currently, fingerprint identification sensors are designed and manufactured by the chip technology, with small common sensing region and high price.

SUMMARY

In view of this, the present invention proposes a fingerprint identification device, a touch panel and a fingerprint identification method, which can be well applied in people's daily electronic products.

A fingerprint identification device provided by the present disclosure based on the above mentioned purpose comprises:

a fingerprint identification module, a plurality of gate lines and a plurality of signal lines;

the gate lines and the signal lines cross so as to define a plurality of sensing regions, and each of the sensing regions includes a thin film transistor and a sensing electrode connected to the thin film transistor, a gate electrode of the thin film transistor is connected to the corresponding gate line, a source electrode thereof is connected to the corresponding signal line, and a drain electrode thereof is connected to the sensing electrode;

the signal lines include signal-transmitting lines and signal-receiving lines, and each sensing electrode includes a transmitting electrode connected to the signal-transmitting line and a receiving electrode connected to the signal-receiving line; an electric field is generated between the transmitting electrode and the receiving electrode adjacent to the transmitting electrode, and a direction of the electric field is from the transmitting electrode to the receiving electrode adjacent to the transmitting electrode;

the fingerprint identification module is connected to each of the signal-receiving lines, and determines, by detecting an intensity of the electric field when a finger is in the electric field, a fingerprint of the finger;

the sensing electrodes in an identical row include the transmitting electrodes and the receiving electrodes, and are connected to an identical gate line.

Optionally, the fingerprint identification device further comprises:

first amplifiers, arranged at the sensing regions corresponding to the transmitting electrodes, where an output terminal of each of the first amplifiers is connected to the transmitting electrode of the corresponding sensing region, and an inverting input terminal of each of the first amplifiers is connected to the drain electrode of the thin film transistor of the corresponding sensing region; and second amplifiers, arranged at the sensing regions corresponding to the receiving electrodes, where an output terminal of each of the second amplifiers is connected to the drain electrode of the thin film transistor of the corresponding sensing region, and an inverting input terminal of each of the second amplifiers is connected to the receiving electrode of the corresponding sensing region.

Optionally, the transmitting electrodes and the receiving electrodes in an identical column are arranged alternately.

Optionally, among the sensing electrodes in the identical column, at least one receiving electrode is arranged between every two transmitting electrodes; or at least one transmitting electrode is arranged between every two receiving electrodes.

Optionally, the transmitting electrodes and the receiving electrodes in the identical row are arranged alternately.

Optionally, among the sensing electrodes in the identical row, at least one receiving electrode is arranged between every two transmitting electrodes; or at least one transmitting electrode is arranged between every two receiving electrode.

Optionally, among the sensing electrodes in the identical row, one receiving electrode is arranged between every two transmitting electrodes; and, among the sensing electrodes in an identical column, one receiving electrode is arranged between every two transmitting electrodes.

Optionally, the fingerprint identification module is connected to each of the signal-receiving lines and each of the signal-transmitting lines.

Optionally, the number of the transmitting electrodes is smaller than the number of the receiving electrodes in the identical row.

Optionally, the fingerprint identification device further includes: an environment noise detection unit configured to detect an environment electric field of each of the sensing regions, where the environment electric field is an electric field when the finger is not in touch with the sensing region, by which a reference electric field is acquired when determining the fingerprint of the finger, so as to determine the fingerprint of the finger based on an intensity of the reference electric field and the intensity of the electric field when the finger is in the electric field.

Optionally, the environment noise detection unit further includes a third amplifier and an environment noise sensing electrode; an output terminal of the third amplifier is connected to the environment noise sensing electrode, and an inverting input terminal of the third amplifier is connected to the fingerprint identification module.

Optionally, the device further includes a driving unit configured to drive the gate lines row by row.

Optionally, a density of the sensing electrodes is at least 300 per square inch.

Furthermore, a touch panel is further provided by the present disclosure, including the fingerprint identification device hereinabove.

Optionally, the touch panel further includes a conductive glass layer and a glass substrate, where the fingerprint identification device is arranged at a fingerprint identification region of the touch panel and between the conductive glass layer and the glass substrate.

Furthermore, a fingerprint identification method is further provided by the present disclosure, applied to the fingerprint identification device hereinabove, including:

applying electrical signals to the transmitting electrodes and the receiving electrodes;

acquiring an electric field signal generated between each of the transmitting electrodes and the receiving electrode adjacent to the corresponding transmitting electrode in a direction from the transmitting electrode to the receiving electrode; and determining a fingerprint of the finger based on an intensity of the electric field signal.

Furthermore, a fingerprint identification method is further provided by the present disclosure, applied to the fingerprint identification device hereinabove, including:

applying electrical signals to the transmitting electrodes and the receiving electrodes;

acquiring an electric field signal generated between each of the transmitting electrodes and the receiving electrode adjacent to the corresponding transmitting electrode in a direction from the transmitting electrode to the receiving electrode; and determining a fingerprint of the finger based on an intensity of the electric field signal;

subsequent to acquiring an electric field signal generated between each of the transmitting electrodes and the receiving electrode adjacent to the corresponding transmitting electrode in the direction from the transmitting electrode to the receiving electrode, the method further includes:

determining a reference electric field based on an environment electric field detected by the environment noise detection unit and the acquired electric field signal generated between each of the transmitting electrodes and the receiving electrode adjacent to the corresponding transmitting electrode in the direction from the transmitting electrode to the receiving electrode; and determining the fingerprint of the finger based on an intensity of the reference electric field and the intensity of the electric field when the finger is in the electric field.

Furthermore, an input device is further provided by the present disclosure, including a touch panel according to any one embodiment of the present disclosure.

It can be seen from the foregoing that, the fingerprint identification device, the touch panel, the input device and the fingerprint identification method provided in the present disclosure can reduce the cost of fingerprint identification; since existing display panels have thereon gate lines, signal lines, thin film transistors and the like, meanwhile existing display screens manufactured by display screen manufacturers have high enough pixels that can meet the requirements for sensing electrode density of fingerprint identification, certain improvements of existing display panels can manufacture the fingerprint identification device on the display panel, so that the present disclosure can make use of the existing structures on the display panels that currently have already been popular to implement fingerprint identification, and since the fingerprint identification device is achievable on a touch-specific glass substrate, relative to optical fingerprint identification devices with complicated structures in the prior art, the fingerprint identification device provided in the present disclosure has smaller volume such that fingerprint identification can be widely applied to existing touch electronic devices, improving safety of behavior like electronic equipment unlocking, payment and the like. At the same time, due to the smaller volume of the fingerprint identification device, in the case of adding the fingerprint identification function onto electronic devices, there are no excessive changes made to the volume and costs of the electronic devices.

DETAILED DESCRIPTION

Figure 1:
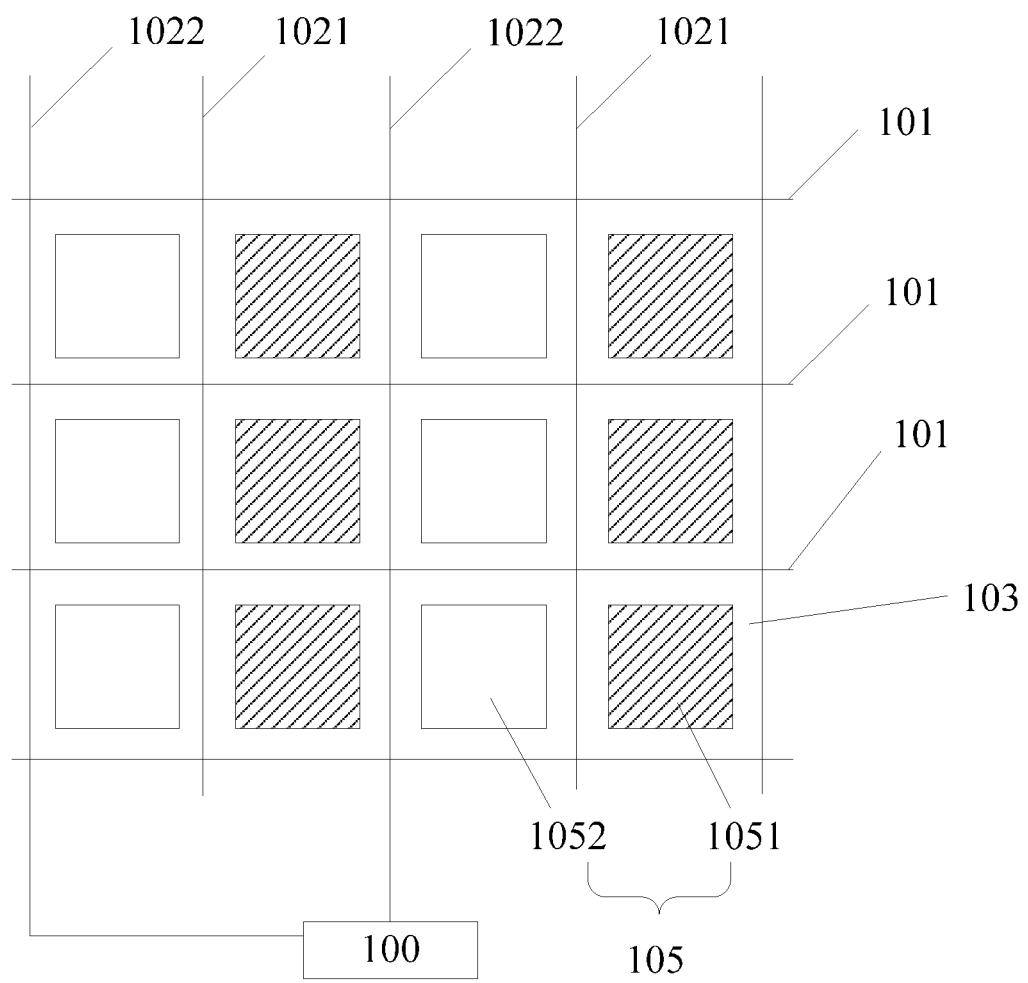
FIG. 1 is a schematic view of a fingerprint identification device in some embodiments of the present disclosure.

In order that the technical problem to be solved, the technical solution and advantages of the disclosure become more apparent, the description thereof will be given below in detail in conjunction with the accompanying drawings and the specific embodiments.

The present disclosure first provides a fingerprint identification device. Since the sensing electrodes will shield the thin film transistor and the rest part of the circuit, it is difficult to present the sensing electrodes and the thin film transistor in one figure, whereby, in conjunction with FIG. 1 and FIG. 2, the structure of a fingerprint identification device in some embodiments of the present disclosure will be described, comprising:

a fingerprint identification module 100, a plurality of gate lines 101 and a plurality of signal lines 102.

The gate lines 101 and the signal lines 102 cross so as to define a plurality of sensing regions 103, and each of the sensing regions 103 includes thin film transistor 104 and a sensing electrode 105 connected to the thin film transistor 104. A gate electrode of the thin film transistor 104 is connected to the corresponding gate line, a source electrode thereof is connected to the corresponding signal line 102, and a drain electrode thereof is connected to the sensing electrode. The thin film transistor 104 is not shown in FIG. 1.

The signal lines 102 include signal-transmitting lines 1021 and signal-receiving lines 1022. The sensing electrodes include transmitting electrodes 1051 connected to the signal-transmitting lines and receiving electrodes 1052 connected to the signal-receiving lines. An electric field is generated between the transmitting electrode 1051 and the receiving electrode 1052 adjacent to the transmitting electrode 1051, and a direction of the electric field is from the transmitting electrode 1051 to the receiving electrode 1052 adjacent to the transmitting electrode 1051. In order to illustrate the circuit structure in the specific embodiment, the sensing electrodes are not shown in FIG. 2.

The fingerprint identification module 100 is connected to each of the signal-receiving lines 1022, and determines, by detecting an intensity of the electric field, a fingerprint of the finger.

The sensing electrodes in an identical row include the transmitting electrodes and the receiving electrodes, and are connected to an identical gate line.

From the above, the fingerprint identification device provided in the present disclosure makes use of the gate lines and signal lines to implement finger identification, while an electric field is formed between adjacent transmitting and receiving electrodes. Because fingerprint concave and convex are caused by dermis concave and convex, while the dermis has cell fluid and hence is electrically conductive and can absorb electric field lines, it may be determined whether the fingerprint is concave or convex by measuring the fingerprint and identifying the intensity of the electric field above the sensing terminals. When the fingerprint identification device provided in the present disclosure is used for fingerprint identification, when the finger enters into the electric field, the concave and convex of the dermis of the fingerprint will affect the intensity and magnitude of the electric field, leading to the change in the intensity of the electric field, and further by detecting the intensity of the electric field by the fingerprint identification module, the concave and convex of the fingerprint may be indirectly detected to thereby implement fingerprint detection. Since currently electronic devices with a touch function have been popular, touch electronics products also implement the touch functionality through the gate lines, the signal lines; the fingerprint identification device of the disclosure is able to use the original structure of the existing electronic device having a touch function as part of the structure to implement the fingerprint identification function, thereby greatly reducing the popularity difficulty of the fingerprint identification function in electronic devices. Since the conventional display panel itself comprises gate lines, signal lines, thin film transistors and other components, while the conventional display screens manufactured by existing display screen manufacturer have high enough pixels to be able to meet the density requirements for the sensing electrodes for fingerprint identification, certain improvements may be made to existing display panels such that the fingerprint identification device may be manufactured on the display panel, which is conducive to rapid implementation and promotion in all kinds of electronic products that people use every day.

The transmitting electrodes 1051 and the receiving electrodes 1052 in an identical row are arranged alternately, which includes the following cases:

among the sensing electrodes in the same row, one receiving electrode 1052 is arranged between every two transmitting electrodes 1051, and one transmitting electrodes 1051 is arranged between every two receiving electrodes 1052; or among the sensing electrodes in the same row, more than one receiving electrodes 1052 are arranged between every two transmitting electrodes 1051; or among the sensing electrodes in the same row, more than one transmitting electrodes 1051 are arranged between every two receiving electrodes 1052.

In some embodiments of the present disclosure, the method further includes: determining the fingerprint of the finger by detecting changes in the electric field when the finger enters into the electric field. In one particular embodiment, it is first to detect the electric field value when the finger enters the electric field, then calculate an electric field change value according to the electric field value when the finger is not in touch, and thereafter determine the fingerprint according to the electric field change value.

On the other hand, a density of the sensing electrodes is at least 300 per square inch. The fingerprint sensor needs a density of 300 or more sensing terminals per unit inch, while display screens that display screen manufacturers can produce generally have reached 300 ppi or more, that is, more than 300 pixels per inch. Considering one pixel is three sub-pixels, existing display screens and touch screens can meet the density requirements for fingerprint identification. The density of touch on the existing touch screen is far smaller than the density required for fingerprint identification, whereby if the fingerprint identification device provided in the present disclosure is directly manufactured on the touch screen, the touch function still can be provided in the region for fingerprint identification thereof, without greatly affecting the original function of the touch screen.

The electric field from the transmitting electrode 1051 to the receiving electrode 1052 is the electric field actually generated between the transmitting electrode 1051 and the receiving electrode 1052.

In some embodiments of the present disclosure, the function of the fingerprint identification module can be implemented by corresponding chips.

In some embodiments of the present disclosure, the sensing electrode should have a certain area, for example, the sensing electrode may be a square or rectangular metal layer, such as the transmitting electrode 1051 and the receiving electrode 1052 shown in FIG. 1.

In some embodiments of the present disclosure, the fingerprint identification module is further connected to the signal-transmitting line.

In the above embodiment, the signal-transmitting line and the signal-receiving line are relative concepts, i.e., a signal line connected to a transmitting electrode is a signal-transmitting line, and a signal line connected to a receiving electrode is a signal-receiving line. When a signal line is connected to both a signal-transmitting line and a signal-receiving line, the signal line is both a signal-transmitting line and a signal-receiving line.

Figure 2:
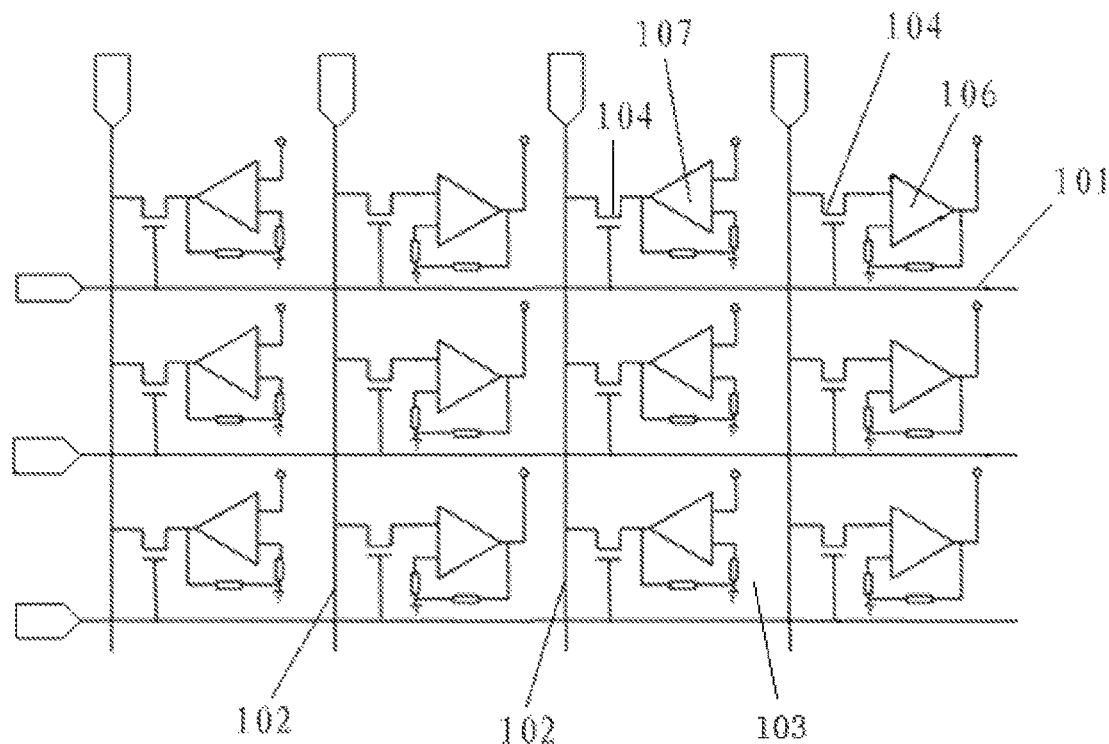
FIG. 2 is a schematic view of the circuit structure of FIG. 1.

In some embodiments of the present disclosure, still referring to FIG. 2, the fingerprint identification device further includes:

first amplifiers 106, arranged at sensing regions corresponding to the transmitting electrodes, where an output terminal of each of the first amplifiers 106 is connected to the transmitting electrode of the corresponding sensing region, and an inverting input terminal of each of the first amplifiers is connected to the drain electrode of the thin film transistor 104 of the corresponding sensing region;

a second amplifier 107, arranged at the sensing regions corresponding to the receiving electrodes, where an output terminal of each of the second amplifiers 107 is connected to the drain electrode of the thin film transistor 104 of the corresponding sensing region, and an inverting input terminal of each of the second amplifiers 107 is connected to the receiving electrode of the corresponding sensing region.

Since the fingerprint is fine and dense, when the fingerprint is detected, the electric field from the transmitting electrode to the receiving electrode is not strong, and the change of the electric field caused by the finger in the electric field is weak. In order to improve the electric field detection precision and to further improve the fingerprint identification precision, an amplifier is used to amplify the electric signal, so that the electric field from the transmitting electrode to the receiving electrode may be strong, the influence caused by the fingerprint on the intensity of the electric field is also amplified, and then the electric field change is also amplified, thereby improving the detection accuracy.

Figure 4:
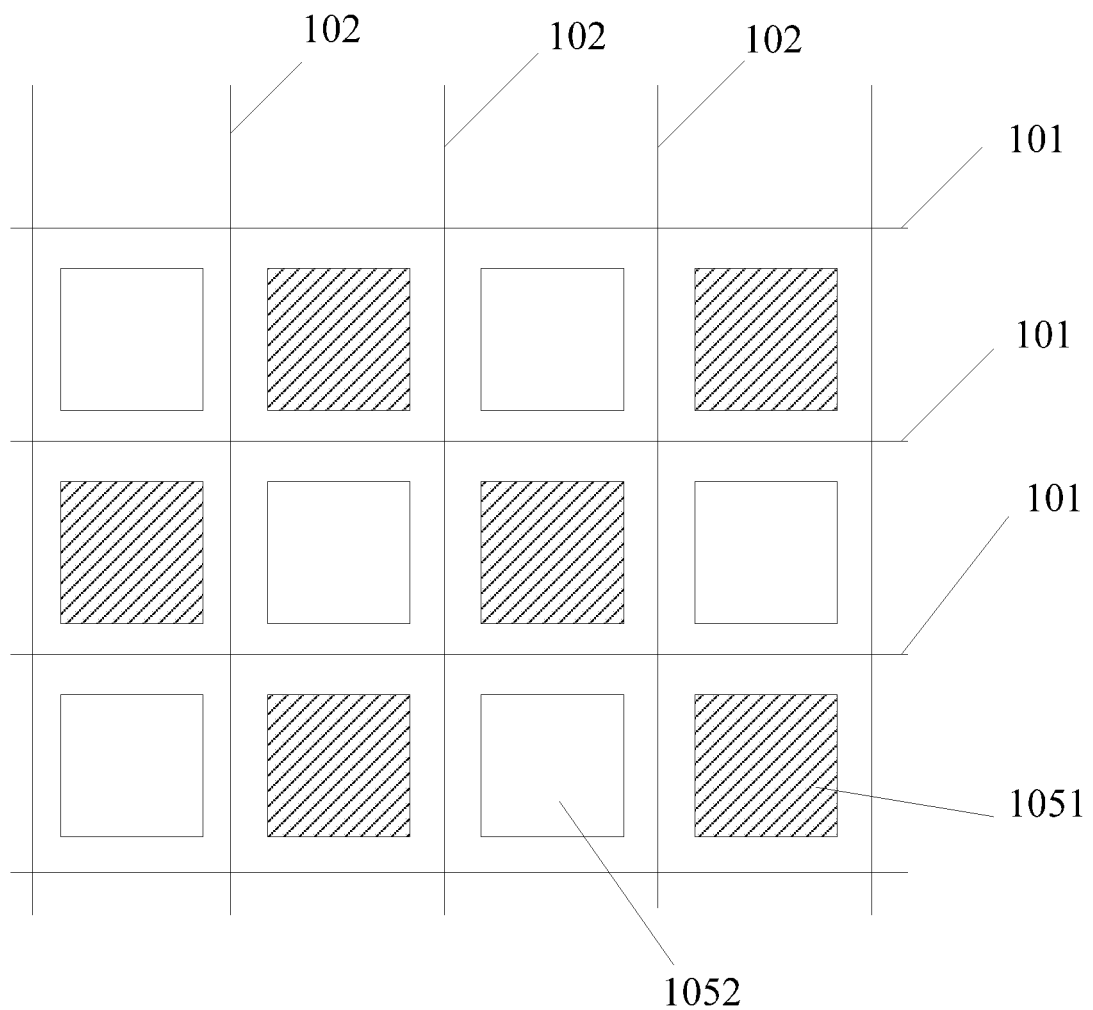
FIG. 4 is a schematic view of sensing electrodes of a fingerprint identification device in some embodiments of the present disclosure.

In some embodiments of the present disclosure, as shown in FIG. 4, the transmitting electrodes 1051 and the receiving electrodes 1052 in the same column are arranged alternately, so that the adjacent two rows of transmitting electrodes and receiving electrodes are arranged in cross to increase the difference of electric field signal between the two adjacent rows, thereby increasing the identification precision and improving the identification effect. In some embodiments of the present disclosure, the direction defined by the gate lines is row and the direction defined by the signal lines is column.

The transmitting electrodes 1051 and the receiving electrodes 1052 in an identical column are arranged alternately, which includes the following cases:

among the sensing electrodes in the same column, one receiving electrode 1052 is arranged between every two transmitting electrodes 1051, and one transmitting electrode 1051 is arranged between every two receiving electrodes 1052; or among the sensing electrodes in the same column, more than one receiving electrodes 1052 are arranged between every two transmitting electrodes 1051; or among the sensing electrodes in the same column, more than one transmitting electrodes 1051 are arranged between every two receiving electrodes 1052.

Figure 5:
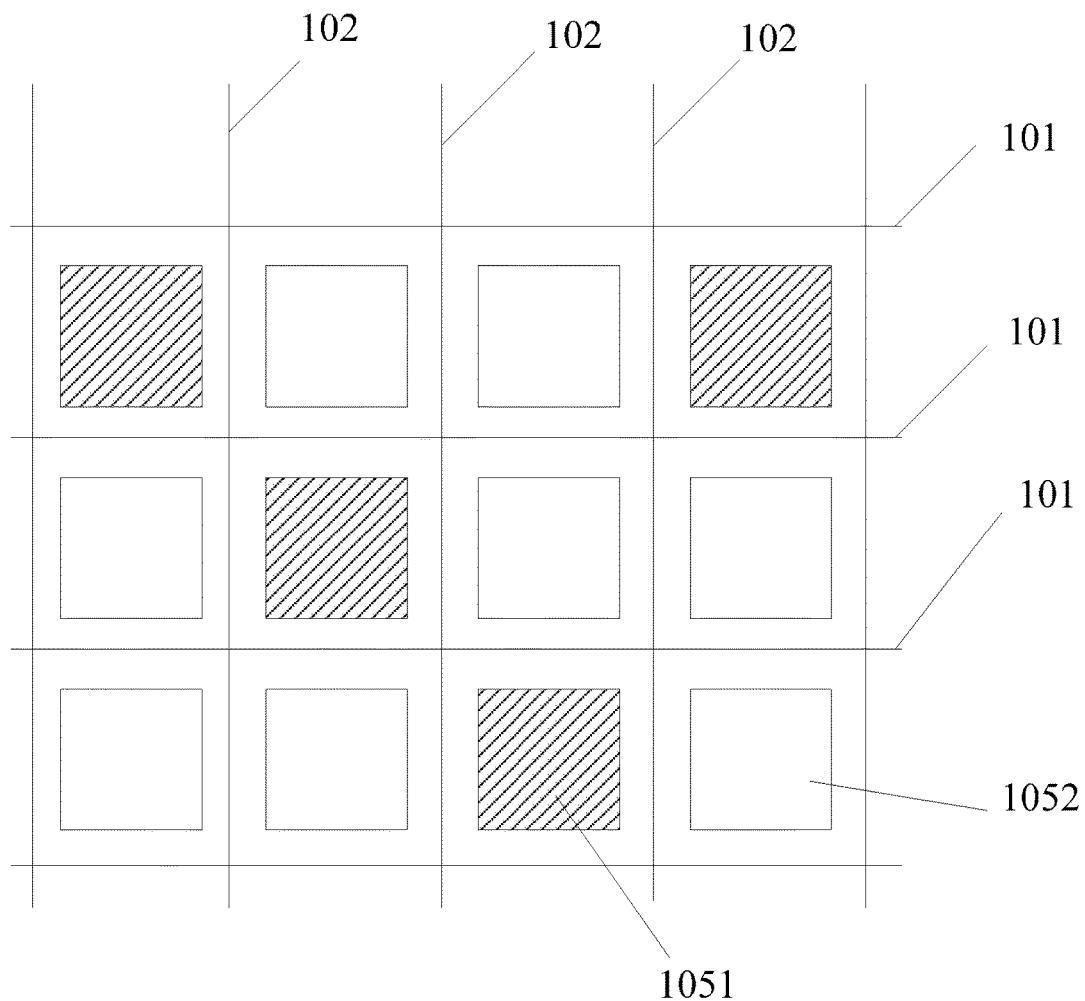
FIG. 5 is a schematic view of sensing electrodes of a fingerprint identification device in some embodiments of the present disclosure.

In some embodiments of the present disclosure, as shown in FIG. 5, the number of the transmitting electrodes is smaller than the number of the receiving electrodes in the identical row. According to the embodiment of the present disclosure, the identification precision may be further improved and the identification effect may be further improved.

In some embodiments of the present disclosure, as shown in FIGS. 4-5, since the electrodes in the same column may include both the transmitting electrodes and the receiving electrodes, one signal line may be both a signal-transmitting line and a signal-receiving line.

In some embodiments of the present disclosure, the fingerprint identification device further includes a driving unit configured to drive the gate lines row by row.

Figure 6:
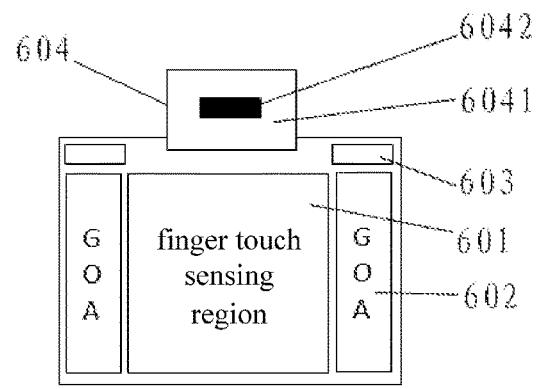
FIG. 6 is a schematic view of a fingerprint identification device in some embodiments of the present disclosure.
Figure 9A:
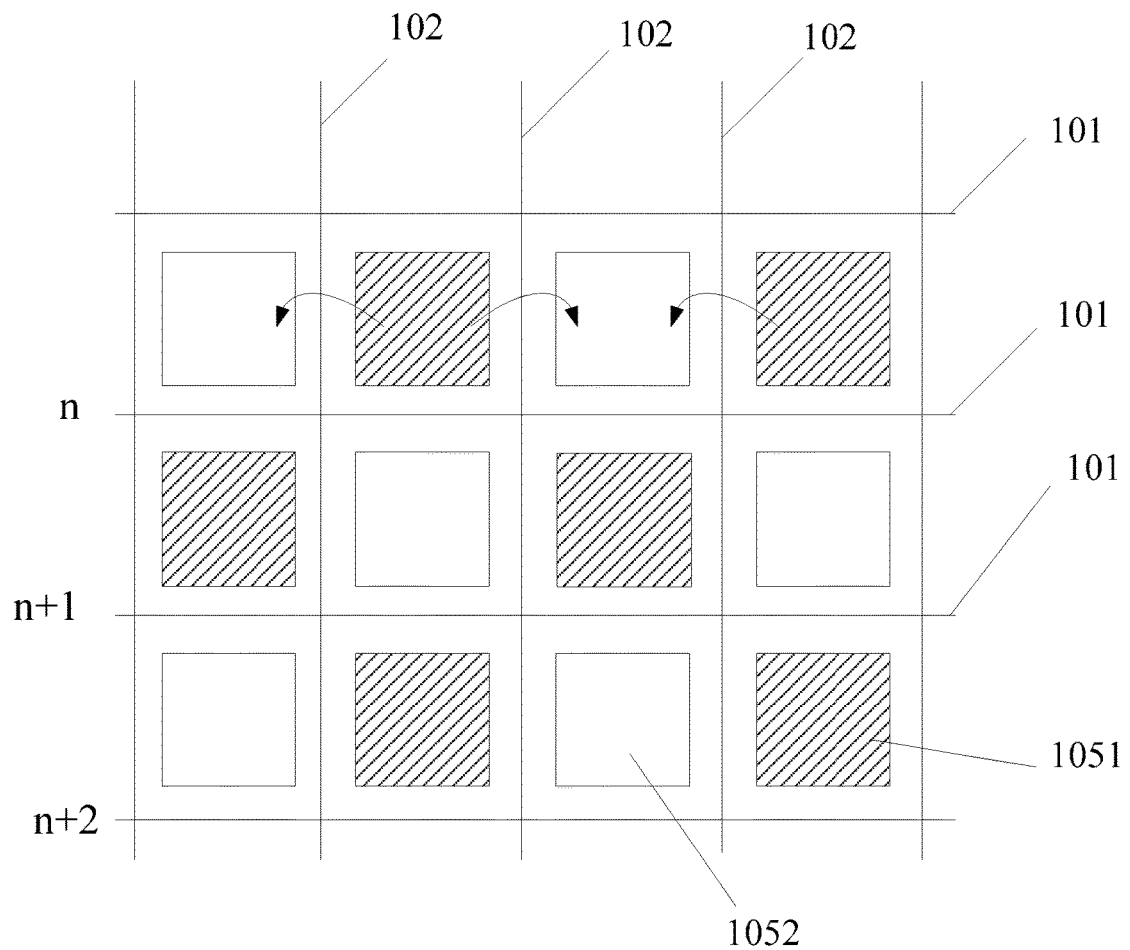
FIGS. 9B, 9A are schematic views of a process of driving a fingerprint identification device in some embodiments of the present disclosure.
Figure 9B:
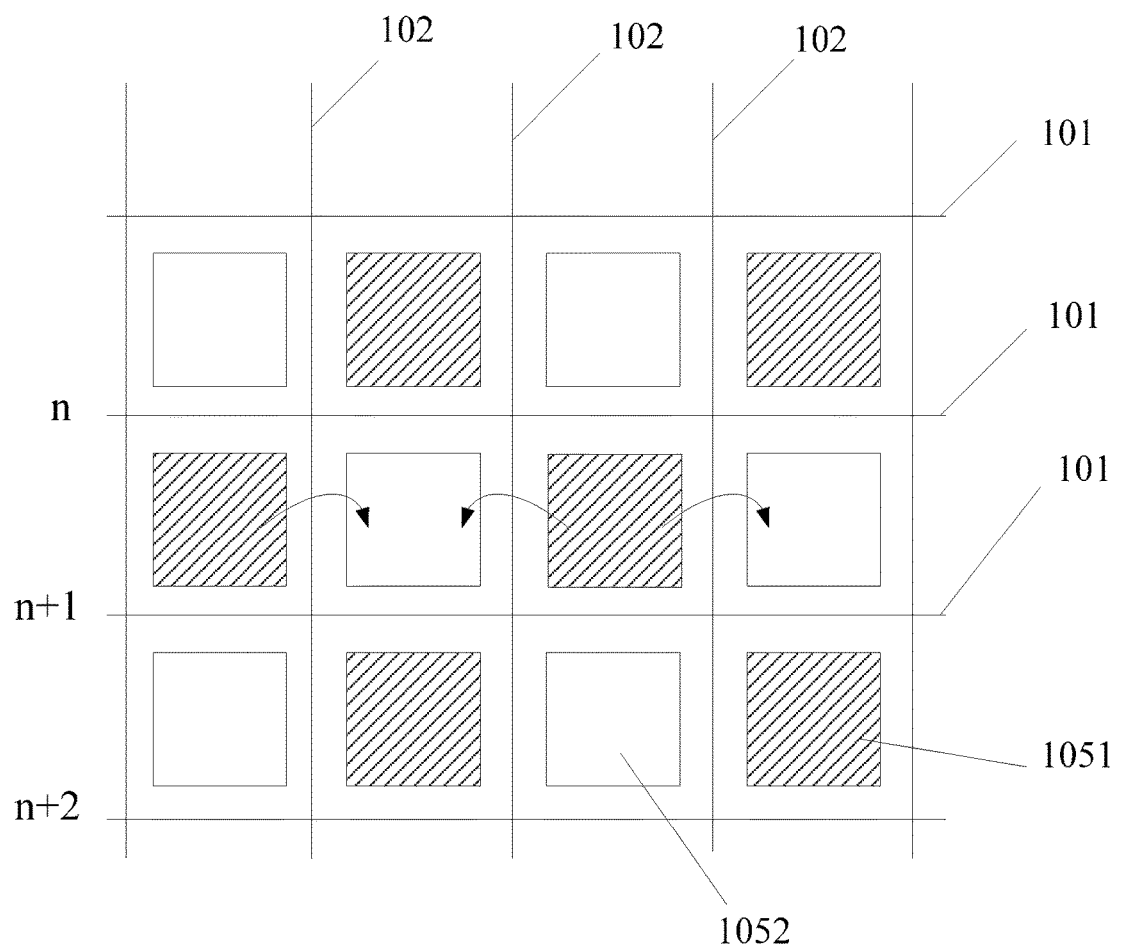

As shown in FIG. 6, a plurality of sensing regions defined by the gate lines and signal lines of the fingerprint identification device together can serve as a finger touch sensing region 601, and the drive unit may employ Gate On Array (GOA) unit 602. The GOA unit 602 is provided on both sides of the finger touch sensing region 601, each including a thin film transistor (TFT), a shift registers and the like and configured to drive the gate lines row by row. The driving process is shown in FIGS. 9A-9B. Referring to FIG. 9A, when a voltage is applied to the $n^{th}$ row of the gate lines 101, electric field are generated between adjacent sensing electrodes corresponding to the $n^{th}$ row of the gate lines 101, of which the directions are presented by the arrows in FIG. 9A. Referring to FIG. 6 again, when signals are transmitted by the transmitting electrodes of the amplifiers and the finger enters into the electric field, the fingerprint identification module 604 detects a change of the electric field via the signal lines 102. After determining that the finger has pressed on the surface of the fingerprint identification device, the receiving electrode receives the signals through the amplifiers. Subsequently, as shown in FIG. 9B, when a voltage is applied to the $(n+1)^{th}$ row of the gate lines 101, electric field are generated between adjacent sensing electrodes corresponding to the $(n+1)^{th}$ row of the gate lines 101, of which the directions are presented by the arrows in FIG. 9B. Referring to FIG. 6 again, the thin film transistors, the amplifiers and the sensing electrodes and the like corresponding to the activated gate lines start to work, and transfer the signals through the signal lines to a chip 6042, so that the chip 6042 may perform, after processing the signals, the identification of the part of the fingerprint corresponding to the $(n+1)^{th}$ row of the gate lines.

In some embodiments of the present disclosure, still referring to FIG. 6, the fingerprint identification device further includes an environment noise detection unit 603 configured to detect an environment electric field of the sensing region. The environment electric field is an electric field of the sensing region when the finger is not in touch with the sensing region, by which a reference electric field is acquired when determining the fingerprint of the finger, so as to determine the fingerprint of the finger based on the intensity of the reference electric field and the intensity of the electric field when the finger is in the electric field. The reference electric field is a difference between an actual electric field and the environment electric field.

The environment noise detection unit 603 may be arranged outside the finger touch sensing region 601, so as to avoid mistaken touch by the finger during fingerprint detection. Since the electric filed from the transmitting electrode to the receiving electrode is small, the environment may highly influence the electric field, so that the intensity of electric field may be changed significantly due to environment factors like environment humidity, pressure and the like, and then the change of the electric field may become the environment noise. To improve precision, it is necessary to eliminate the influence caused by environment factors on the electric field from the transmitting electrode to the receiving electrode. Specifically, the environment noise detection unit 603 in the present embodiment may be used, and the intensity of the electric field from the transmitting electrode to the receiving electrode may be set as a rated value. In an ideal state, that is, in a state where the influence caused by the environment on the intensity of the electric field can be ignored, the rating value of the electric field from the transmitting electrode to the receiving electrode may serve as the reference electric field. However, in an actual state, the environment may influence adversely the electric field from the transmitting electrode to the receiving electrode. The environment noise detection unit 603 may detect the electric field change caused by the environment factors to obtain environment noise, so that the finger identification may be adjusted based on the rating value of the electric field, and then the chip of the fingerprint identification module may filter the interference generated by the environment factors to the electric field through signal comparison and remove the environment noise, thereby achieving a higher signal to noise ratio, reducing the influence of the environment factors to the electric field that further affects the fingerprint identification, and improving the sensitivity of fingerprint identification.

In the fingerprint identification device shown in FIG. 6, the fingerprint identification module 604 includes a flexible circuit board 6041 and a chip 6042. The chip 6042 is arranged on the flexible circuit board 6041. In some specific embodiments, the flexible circuit board 6041 is connected to the gate lines, the signal lines, the GOA unit 602, the noise detection unit 603 and the like, so that the chip 6042 can control the electric field and detect changes of the electric field. The flexible circuit board 6041 is provided thereon with a universal interface by which the flexible circuit board 6041 may be connected to any electronic product.

Figure 7:
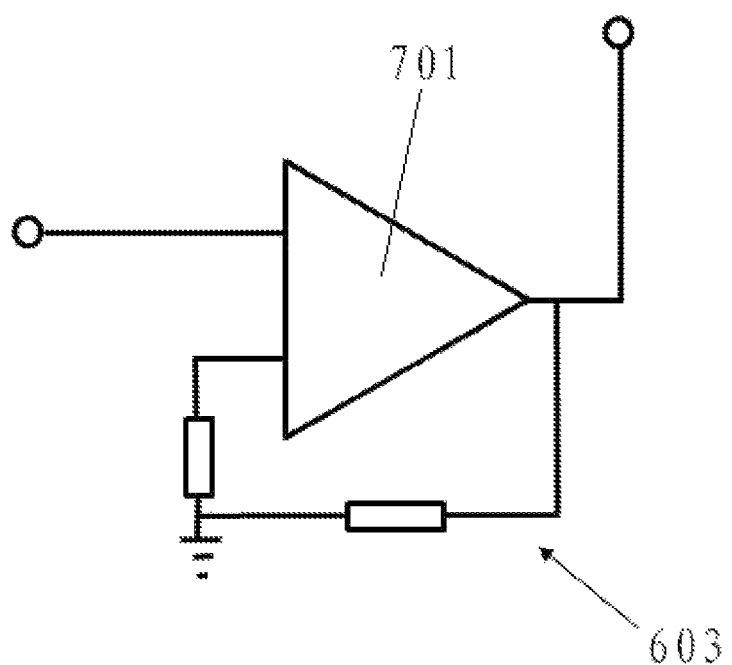
FIG. 7 is a schematic view of a circuit structure of an environment noise detection unit in some embodiments of the present disclosure.

In some embodiments of the present disclosure, as shown in FIG. 7, the environment noise detection unit 603 further includes a third amplifier 701 and an environment noise sensing electrode. An output terminal of the third amplifier is connected to the environment noise sensing electrode, and an inverting input terminal of the third amplifier 701 is connected to the fingerprint identification module. The environment noise sensing electrodes and the fingerprint identification module are not shown in FIG. 7.

Furthermore, a touch panel is provided by the present disclosure, including the fingerprint identification device provided in any one of the embodiments of the present disclosure.

Figure 8:
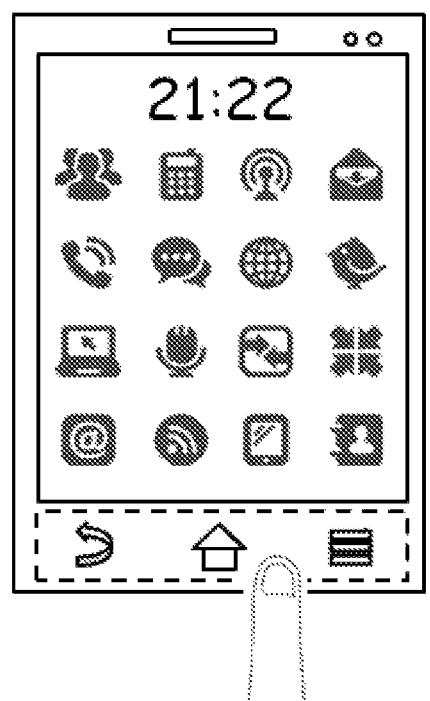
FIG. 8 is a schematic view of a touch panel in some embodiments of the present disclosure.

FIG. 8 is a schematic diagram of a touch panel of the disclosed embodiment. The fingerprint identification device provided in the embodiment of the present disclosure is applied to a touch panel of a mobile phone or tablet computer. The region corresponding to the dashed line in FIG. 8 is the fingerprint identification region of the touch panel, in which the fingerprint identification is implemented. In the specific implementation, the fingerprint identification region can be made larger, so that the user can press the finger in a larger range to implement fingerprint identification, to improve the convenience of use and further improve the user experience. At the same time, the fingerprint identification region may also comprise the original touch function of the touch panel, whereby the original button layout of the touch panel may not be changed.

Figure 3A:
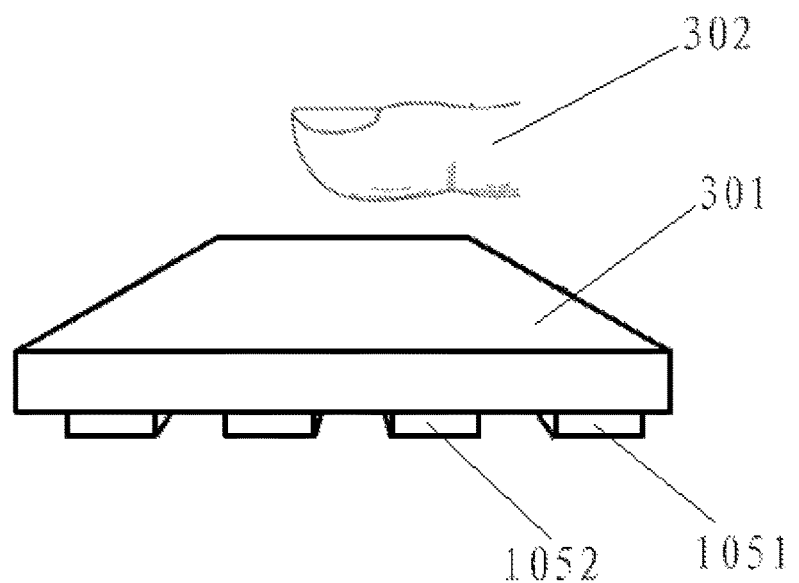
FIG. 3A is a side view of a touch panel in some embodiments of the present disclosure.
Figure 3B:
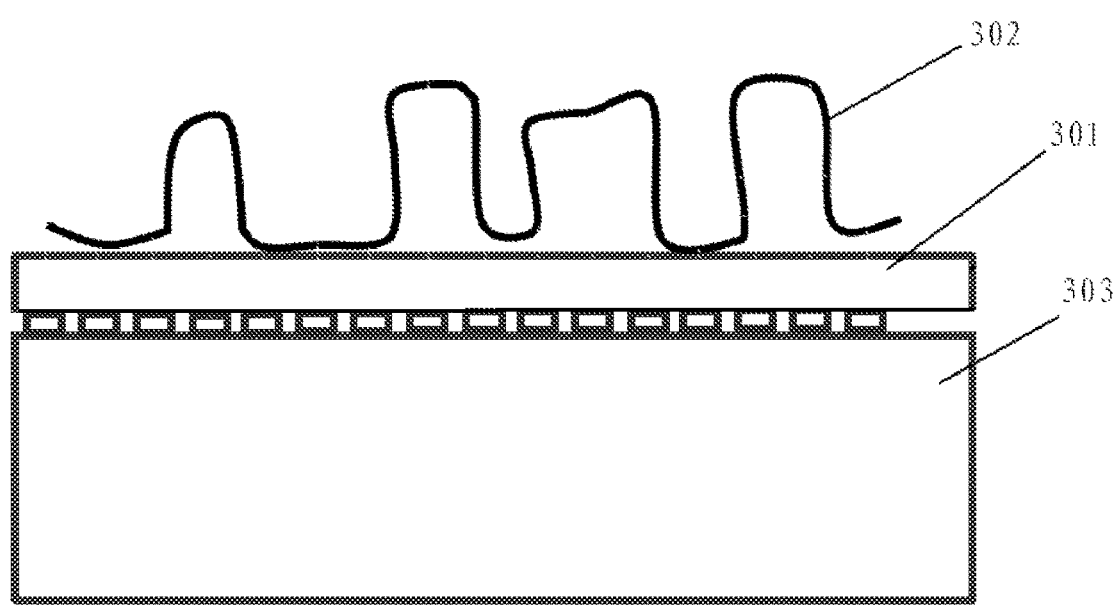
FIG. 3B is a schematic view of a touch panel identifying a fingerprint in some embodiments of the present disclosure.

FIG. 3A is a side view of a touch panel in some embodiments of the present disclosure, the transmitting electrodes 1051 and the receiving electrodes 1052 are arranged below the conductive glass layer 301 of the touch panel, and the circuit part shown in FIG. 2 may be arranged below the transmitting electrodes 1051 and the receiving electrodes 1052. The finger 302 touches the fingerprint identification region on the touch panel, as shown in FIG. 3B, that is, the fingerprint identification can be implemented. The disclosure fingerprint identification device provided in some embodiments of the present disclosure may be provided between the conductive glass layer 301 and the glass substrate 303.

Figure 10:
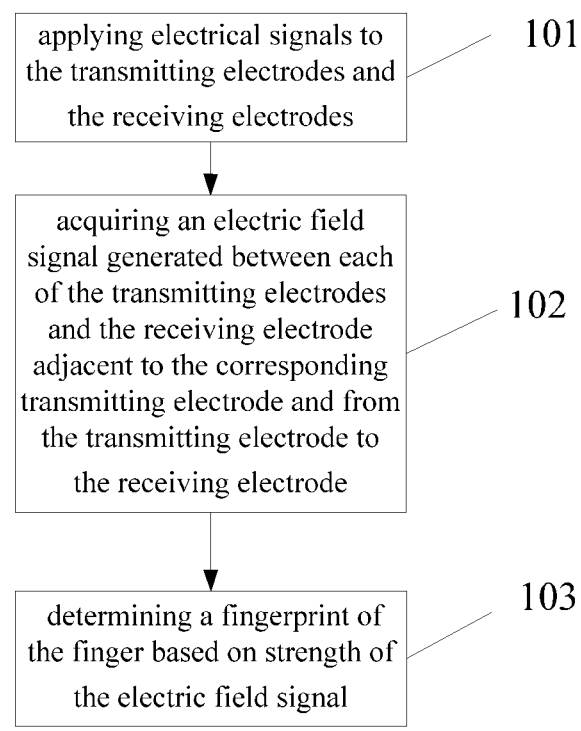
FIG. 10 is a flow chart of a fingerprint identification method in some embodiments of the present disclosure.

A fingerprint identification method is further provided by the present disclosure, applied to the fingerprint identification device provided in any one of embodiments of the present disclosure, including the steps shown in FIG. 10:

Step 101: applying electrical signals to the transmitting electrodes and the receiving electrodes;

Step 102: acquiring an electric field signal generated between each of the transmitting electrodes and the receiving electrode adjacent to the corresponding transmitting electrode and from the transmitting electrode to the receiving electrode; and Step 103: determining a fingerprint of the finger based on an intensity of the electric field signal.

As can be seen from the foregoing, fingerprint identification method provided in the present disclosure can identify the finger texture according to the intensity of the electric field signal so that the finger identification method can be applied to a glass panel, or a substrate, or electronic devices commonly used by users today. There is provided an implementation manner that can be manufactured on the glass substrate and has been broadly applied, without excessively increasing the volume of the electronic device itself, in favor of the promotion of the fingerprint identification method, and with a small influence on the function or volume of the electronic product.

In some embodiments of the present disclosure, the method is applied to the fingerprint identification device provided in some embodiments of the present disclosure, and subsequent to acquiring an electric field signal generated between each of the transmitting electrodes and the receiving electrode adjacent to the corresponding transmitting electrode and from the transmitting electrode to the receiving electrode, the method further includes:

determining a reference electric field based on an environment electric field detected by the environment noise detection unit;

determining the fingerprint of the finger based on an intensity of the reference electric field and the intensity of the electric field when the finger is in the electric field.

The present disclosure also provides an input device, comprising the touch panel provided in any one embodiment of the present disclosure, which input device may be one kind of device needing fingerprint identification like phone, tablet, remote control and fingerprint attendance device.

As can be seen from the foregoing, the fingerprint identification device, the touch panel, the input device and the fingerprint identification method provided in the present disclosure can make use of the existing structures on the display panels that currently have already been popular to implement fingerprint identification, can reduce the costs of fingerprint identification, decrease the volume of the fingerprint identification device so that fingerprint identification can be widely applied to the relevant touch electronic devices, improve security of usage behavior like electronic device unlocking, payment and the like, without greatly changing the volume and costs of the electronic device itself.

It should be understood that a plurality of the embodiments described in the description are illustrative only and explain the present disclosure, not intended to limit the present disclosure. Without conflict, the embodiments of the present application and features in the embodiments may be combined with each other.

Obviously, those skilled in the art may make various changes and modifications to the present disclosure without departing from the spirit and scope of the present disclosure. Thus, if such changes and modifications of the present disclosure fall within the scope of the claims of the present disclosure and their technical equivalents, the present disclosure is also intended to cover such changes and modifications.

What is claimed is:

1. A fingerprint identification device, comprising:
    a fingerprint identification module, a plurality of gate lines and a plurality of signal lines;
    wherein the gate lines and the signal lines cross so as to define a plurality of sensing regions, and each of the sensing regions comprises a thin film transistor and a sensing electrode connected to the thin film transistor;
    a gate electrode of the thin film transistor is connected to the corresponding gate line, a source electrode thereof is connected to the corresponding signal line, and a drain electrode thereof is connected to the sensing electrode;

the signal lines comprise signal-transmitting lines and signal-receiving lines, and each sensing electrode comprises a transmitting electrode connected to the signal-transmitting line and a receiving electrode connected to the signal-receiving line; an electric field is generated between the transmitting electrode and the receiving electrode adjacent to the transmitting electrode, and a direction of the electric field is from the transmitting electrode to the receiving electrode adjacent to the transmitting electrode;

the fingerprint identification module is connected to each of the signal-receiving lines, and determines, by detecting an intensity of the electric field when a finger is in the electric field, a fingerprint of the finger; and the sensing electrodes in an identical row comprise the transmitting electrodes and the receiving electrodes, and are connected to an identical gate line;

wherein the fingerprint identification device further comprises:

first amplifiers, arranged at the sensing regions corresponding to the transmitting electrodes, wherein an output terminal of each of the first amplifiers is connected to the transmitting electrode of the corresponding sensing region, and an inverting input terminal of each of the first amplifiers is connected to the drain electrode of the thin film transistor of the corresponding sensing region; and second amplifiers, arranged at the sensing regions corresponding to the receiving electrodes, wherein an output terminal of each of the second amplifiers is connected to the drain electrode of the thin film transistor of the corresponding sensing region, and an inverting input terminal of each of the second amplifiers is connected to the receiving electrode of the corresponding sensing region.

2. The fingerprint identification device according to claim 1, wherein the transmitting electrodes and the receiving electrodes in an identical column are arranged alternately.

3. The fingerprint identification device according to claim 2, wherein, among the sensing electrodes in the identical column, at least one receiving electrode is arranged between every two transmitting electrodes; or at least one transmitting electrode is arranged between every two receiving electrodes.

4. The fingerprint identification device according to claim 1, wherein the transmitting electrodes and the receiving electrodes in the identical row are arranged alternately.

5. The fingerprint identification device according to claim 4, wherein, among the sensing electrodes in the identical row, at least one receiving electrode is arranged between every two transmitting electrodes; or at least one transmitting electrode is arranged between every two receiving electrode.

6. The fingerprint identification device according to claim 1, wherein, among the sensing electrodes in the identical row, one receiving electrode is arranged between every two transmitting electrodes; and, among the sensing electrodes in an identical column, one receiving electrode is arranged between every two transmitting electrodes.

7. The fingerprint identification device according to claim 1, wherein the fingerprint identification module is connected to each of the signal-receiving lines and each of the signal-transmitting lines.

8. The fingerprint identification device according to claim 1, wherein the number of the transmitting electrodes is smaller than the number of the receiving electrodes in the identical row.

9. The fingerprint identification device according to claim 1, further comprising an environment noise detection unit configured to detect an environment electric field of each of the sensing regions, wherein the environment electric field is an electric field when the finger is not in touch with the sensing region, by which a reference electric field is acquired when determining the fingerprint of the finger, so as to determine the fingerprint of the finger based on an intensity of the reference electric field and the intensity of the electric field when the finger is in the electric field.

10. The fingerprint identification device according to claim 9, wherein the environment noise detection unit further comprises a third amplifier and an environment noise sensing electrode;

an output terminal of the third amplifier is connected to the environment noise sensing electrode, and an inverting input terminal of the third amplifier is connected to the fingerprint identification module.

11. The fingerprint identification device according to claim 1, further comprising a driving unit configured to drive the gate lines row by row.

12. The fingerprint identification device according to claim 1, wherein a density of the sensing electrodes is at least 300 per square inch.

13. A touch panel, comprising a fingerprint identification device, wherein the fingerprint identification device comprises:

a fingerprint identification module, a plurality of gate lines and a plurality of signal lines:

wherein the gate lines and the signal lines cross so as to define a plurality of sensing regions, and each of the sensing regions comprises a thin film transistor and a sensing electrode connected to the thin film transistor;

a gate electrode of the thin film transistor is connected to the corresponding gate line, a source electrode thereof is connected to the corresponding signal line, and a drain electrode thereof is connected to the sensing electrode;

the signal lines comprise signal-transmitting lines and signal-receiving lines, and each sensing electrode comprises a transmitting electrode connected to the signal-transmitting line and a receiving electrode connected to the signal-receiving line; an electric field is generated between the transmitting electrode and the receiving electrode adjacent to the transmitting electrode, and a direction of the electric field is from the transmitting electrode to the receiving electrode adjacent to the transmitting electrode;

the fingerprint identification module is connected to each of the signal-receiving lines, and determines, by detecting an intensity of the electric field when a finger is in the electric field, a fingerprint of the finger; and the sensing electrodes in an identical row comprise the transmitting electrodes and the receiving electrodes, and are connected to an identical gate line;

wherein the fingerprint identification device further comprises an environment noise detection unit configured to detect an environment electric field of each of the sensing regions, wherein the environment electric field is an electric field when the finger is not in touch with the sensing region, by which a reference electric field is acquired when determining the fingerprint of the finger, so as to determine the fingerprint of the finger based on an intensity of the reference electric field and the intensity of the electric field when the finger is in the electric field;

wherein the environment noise detection unit further comprises a third amplifier and an environment noise sensing electrode;

an output terminal of the third amplifier is connected to the environment noise sensing electrode, and an inverting input terminal of the third amplifier is connected to the fingerprint identification module.

14. The touch panel according to claim 13, further comprising a conductive glass layer and a glass substrate, wherein the fingerprint identification device is arranged at a fingerprint identification region of the touch panel and between the conductive glass layer and the glass substrate.

15. A fingerprint identification method, applied to the fingerprint identification device according to claim 1, comprising:
applying electrical signals to the transmitting electrodes and the receiving electrodes;
acquiring an electric field signal generated between each of the transmitting electrodes and the receiving electrode adjacent to the corresponding transmitting electrode in a direction from the transmitting electrode to the receiving electrode; and
determining a fingerprint of the finger based on an intensity of the electric field signal.

16. A fingerprint identification method, applied to the fingerprint identification device according to claim 9, comprising:
applying electrical signals to the transmitting electrodes and the receiving electrodes;
acquiring an electric field signal generated between each of the transmitting electrodes and the receiving electrode adjacent to the corresponding transmitting electrode in a direction from the transmitting electrode to the receiving electrode; and
determining a fingerprint of the finger based on an intensity of the electric field signal;
wherein, subsequent to acquiring an electric field signal generated between each of the transmitting electrodes and the receiving electrode adjacent to the corresponding transmitting electrode in the direction from the transmitting electrode to the receiving electrode, the method further comprises:
determining a reference electric field based on an environment electric field detected by the environment noise detection unit and the acquired electric field signal generated between each of the transmitting electrodes and the receiving electrode adjacent to the corresponding transmitting electrode in the direction from the transmitting electrode to the receiving electrode; and
determining the fingerprint of the finger based on an intensity of the reference electric field and the intensity of the electric field when the finger is in the electric field.

17. An input device, comprising a touch panel according to claim 13.

18. A fingerprint identification method, applied to the fingerprint identification device according to claim 10, comprising:
applying electrical signals to the transmitting electrodes and the receiving electrodes;
acquiring an electric field signal generated between each of the transmitting electrodes and the receiving electrode adjacent to the corresponding transmitting electrode in a direction from the transmitting electrode to the receiving electrode; and
determining a fingerprint of the finger based on an intensity of the electric field signal;
wherein, subsequent to acquiring an electric field signal generated between each of the transmitting electrodes and the receiving electrode adjacent to the corresponding transmitting electrode in the direction from the transmitting electrode to the receiving electrode, the method further comprises:
determining a reference electric field based on an environment electric field detected by the environment noise detection unit and the acquired electric field signal generated between each of the transmitting electrodes and the receiving electrode adjacent to the corresponding transmitting electrode in the direction from the transmitting electrode to the receiving electrode; and
determining the fingerprint of the finger based on an intensity of the reference electric field and the intensity of the electric field when the finger is in the electric field.

19. A touch panel, comprising the fingerprint identification device according to claim 1.

20. A fingerprint identification device, comprising:
a fingerprint identification module, a plurality of gate lines and a plurality of signal lines;
wherein the gate lines and the signal lines cross so as to define a plurality of sensing regions, and each of the sensing regions comprises a thin film transistor and a sensing electrode connected to the thin film transistor;
a gate electrode of the thin film transistor is connected to the corresponding gate line, a source electrode thereof is connected to the corresponding signal line, and a drain electrode thereof is connected to the sensing electrode;
the signal lines comprise signal-transmitting lines and signal-receiving lines, and each sensing electrode comprises a transmitting electrode connected to the signal-transmitting line and a receiving electrode connected to the signal-receiving line; an electric field is generated between the transmitting electrode and the receiving electrode adjacent to the transmitting electrode, and a direction of the electric field is from the transmitting electrode to the receiving electrode adjacent to the transmitting electrode;
wherein the fingerprint identification device further comprises an environment noise detection unit configured to detect an environment electric field of each of the sensing regions, wherein the environment electric field is an electric field when the finger is not in touch with the sensing region, by which a reference electric field is acquired when determining the fingerprint of the finger, so as to determine the fingerprint of the finger based on an intensity of the reference electric field and the intensity of the electric field when the finger is in the electric field;
wherein the environment noise detection unit further comprises a third amplifier and an environment noise sensing electrode;
an output terminal of the third amplifier is connected to the environment noise sensing electrode, and an inverting input terminal of the third amplifier is connected to the fingerprint identification module.

* * * * *